United States Patent
Yamakawa et al.

(10) Patent No.: US 10,459,267 B2
(45) Date of Patent: Oct. 29, 2019

(54) DISPLAY APPARATUS COMPRISING A DISPLAY PANEL CHASSIS HAVING A RECESS PORTION OR A PROTRUDED PORTION AT A CENTER PORTION OF A LONG SIDE AND METHOD OF MANUFACTURING THE SAME

(71) Applicant: Sakai Display Products Corporation, Osaka (JP)

(72) Inventors: Ryo Yamakawa, Osaka (JP); Kouji Matsumoto, Osaka (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 0 days.

(21) Appl. No.: 15/841,680

(22) Filed: Dec. 14, 2017

(65) Prior Publication Data

US 2018/0107060 A1    Apr. 19, 2018

Related U.S. Application Data

(63) Continuation-in-part of application No. PCT/JP2015/067149, filed on Jun. 15, 2015.

(51) Int. Cl.
*G02F 1/1333* (2006.01)
*G02F 1/1335* (2006.01)

(52) U.S. Cl.
CPC .. *G02F 1/133308* (2013.01); *G02F 1/133504* (2013.01); *G02F 1/133528* (2013.01); *G02F 1/133608* (2013.01); *G02F 1/133615* (2013.01); *G02F 2001/13332* (2013.01); *G02F 2001/133314* (2013.01);

(Continued)

(58) Field of Classification Search
CPC .............. G02F 2001/133531; G02F 2201/54
See application file for complete search history.

(56) References Cited

U.S. PATENT DOCUMENTS

| 2009/0079904 A1 | 3/2009 | Yada et al. |
| 2009/0195728 A1 | 8/2009 | Obata et al. |

(Continued)

FOREIGN PATENT DOCUMENTS

| JP | 2004046254 A | 2/2004 |
| JP | 2008014988 A | 1/2008 |

(Continued)

OTHER PUBLICATIONS

English Translation of the International Search Report, PCT International Application No. PCT/JP2015/067149, Japan Patent Office, Tokyo, Japan, dated Jul. 7, 2015.

*Primary Examiner* — Paul C Lee
(74) *Attorney, Agent, or Firm* — Marsh Fischmann & Breyfogle LLP

(57) ABSTRACT

Provided is a display apparatus allowing the occurrence of display defects to be minimized. In each center portion of two long sides of the display apparatus, a spacer 5 on the panel chassis 3 side has a projection 50 projecting toward a bezel 6, and a spacer 7 on the bezel 6 side is provided with a notch longer than the length of the projection 50 at the portion opposite the projection 50. That is, the bezel 6 has a recess 60 formed by one surface of a flat plate part 6a and the end surface of the spacer 7 at the notch portion of the spacer 7. In the display apparatus, a liquid crystal panel 1 is assembled with one surface thereof curved outward.

14 Claims, 2 Drawing Sheets

(52) U.S. Cl.
CPC ............ *G02F 2001/133317* (2013.01); *G02F 2001/133531* (2013.01); *G02F 2201/54* (2013.01)

(56) References Cited

U.S. PATENT DOCUMENTS

2009/0322994 A1* 12/2009 Satake .................. C09J 133/02
    349/96
2013/0088820 A1* 4/2013 Kuroda ................ H05K 5/0017
    361/679.01

FOREIGN PATENT DOCUMENTS

| | | | |
|---|---|---|---|
| JP | 2008262165 A | 10/2008 | |
| JP | 2009080165 A | 4/2009 | |
| JP | 2010078887 A | 4/2010 | |
| JP | 2011248363 A | 12/2011 | |
| JP | 2014137566 A1 | 7/2014 | |

\* cited by examiner

DISPLAY APPARATUS COMPRISING A DISPLAY PANEL CHASSIS HAVING A RECESS PORTION OR A PROTRUDED PORTION AT A CENTER PORTION OF A LONG SIDE AND METHOD OF MANUFACTURING THE SAME

CROSS-REFERENCE TO RELATED APPLICATION

This is a continuation-in-part of PCT international application No. PCT/JP2015/067149 filed on Jun. 15, 2015, incorporated herein by reference.

BACKGROUND OF THE INVENTION

The present disclosure relates to a display apparatus for displaying an image.

A display apparatus provided with a liquid crystal panel for displaying an image on its a first surface (front surface) as an image displaying portion is used on a television receiver, an electronic advertising display and the like. The display apparatus has the liquid crystal panel and a back light device disposed at a second surface (rear surface) of the liquid crystal panel. A peripheral portion of the liquid crystal panel is sandwiched by a bezel disposed on the first surface of the liquid crystal panel and a panel chassis disposed on the second surface thereof.

The back light device is classified generally into a direct light type and an edge-light type, and a back light device of the direct light type is widely employed in a large size display apparatus requiring a high image quality. The back light device of the direct light type comprises a shallow box type back light chassis having an opening, a light source disposed on a bottom surface of the back light chassis, and a diffusion plate disposed opposite to the second surface of the liquid crystal panel and covering the opening of the back light chassis. An optical sheet is disposed between the liquid crystal panel and the diffusion plate. The diffusion plate performs uniform diffusion of light from the light source, and the optical sheet performs focusing of light and the like.

SUMMARY OF THE INVENTION

The liquid crystal panel comprises two transparent substrates, each of one surfaces of which faces to each other, a liquid crystal layer sandwiched between the two substrates, and two polarizing films mounted on another surfaces of the two substrates, respectively. One of the two polarizing films, a first polarizing film, has a polarizing direction in a first direction (for example a direction of a short side of the polarizing film), and another one, a second polarizing film, has a polarizing direction in a second direction (for example, a direction of a long side of the polarizing film) crossing at a right angle to the first direction. Namely, the two polarizing films have the polarizing directions crossing at a right angle to each other, and are disposed opposite to each other on outer surfaces of the two transparent substrates. Further, each of the polarizing films is formed by being extended in a right angle direction to the polarizing direction.

Light from the back light device becomes light vibrating only in one direction by being transmitted through the first polarizing film. The liquid crystal panel displays an image on its first surface by changing the vibrating direction of the light by a liquid crystal layer adjusting a transmittance of light by transmitting the second polarizing film.

In the case where the temperature of the display apparatus becomes high during a use thereof, the polarizing film shrinks so as to return to a state before the extending. Here, when a length of the first direction of the polarizing film is longer than a length of the second direction of the polarizing film, the shrinkage of the polarizing film having the second polarizing direction has a larger influence on the liquid crystal panel than shrinkage of the polarizing film having the first polarizing direction in first direction. Therefore, the liquid crystal panel is curved so that the surface of the polarizing film having the first polarizing direction is protruded.

When the liquid crystal panel is curved, an unintentional load is applied by the bezel and the panel chassis to correct the curving of the liquid crystal panel. Therefore, there may occur display defects such as irregular image display due to a non-uniform pressure on the liquid crystal panel and a black image with void due to non-uniform polarizing state of the liquid crystal panel.

In a display apparatus described in JP 2010-078887 A, a panel chassis is in a shape in conformity with the curving of the liquid crystal panel, and the curving of the liquid crystal panel is not corrected, thereby avoiding a defect caused by correcting the curving. Further, in a display apparatus described in JP 2014-137566 A, an elastic member is provided on a portion of the liquid crystal panel supported by the panel chassis to inhibit the curve of the liquid crystal panel by means of an effect of the elastic member.

Problems to be Solved by the Invention

However, in a display apparatus described in JP 2010-078887 A, there is a problem that the optical sheet is sandwiched between the liquid crystal panel and the diffusion plate, thereby generating wrinkling or deformation of the optical sheet and resulting in occurrence of display defects. Further, in the display apparatus described in JP 2014-137566 A, in the case of the display apparatus having a large size screen, inhibition of curving of the liquid crystal panel is not enough and an effect to be exhibited as a countermeasure against display defects is not sufficient.

The present invention has been made in view of such circumstances as mentioned above, and an object of the present invention is to provide a display apparatus which inhibit an occurrence of display defects.

Means to Solve the Problems

A display apparatus according to one embodiment of the present application comprises: a rectangular-shaped liquid crystal panel comprising a pair of transparent substrates with a liquid crystal layer therebetween, a rectangular-shaped first polarizing film or a rectangular-shaped second polarizing film attached to a front surface of the liquid crystal panel or a rear surface of the liquid crystal panel, wherein a polarizing direction of the first polarizing film is a direction of a short side thereof and a polarizing direction of the second polarizing film is a direction of a long side thereof, a diffusion plate disposed opposing to the rear surface of the liquid crystal panel, an optical sheet disposed between the liquid crystal panel and the diffusion plate, a rectangular frame-shaped panel chassis abutting against a peripheral portion of the rear surface of the liquid crystal panel, and a rectangular frame-shaped bezel abutting against a peripheral portion of the front surface of the liquid crystal panel, wherein the bezel or the panel chassis close to the first polarizing film than the second polarizing film has a recess portion at a center portion of a long side, and wherein the panel chassis or the bezel close to the second polarizing film than the first polarizing film has a protruded portion at a center portion of a long side.

According to the embodiment of the present application, the liquid crystal panel is curved so that the polarizing film having the polarizing direction in the short side direction is projected. Under a high temperature environment, the polarizing film shrinks in a direction perpendicular to the polarizing direction, and the liquid crystal panel is prone to be curved so as to be projected toward the polarizing film having the polarizing direction in the long side direction. Therefore, by allowing the liquid crystal panel to be curved so as to be projected toward the polarizing film having the polarizing direction in the short side direction, the liquid crystal panel can be prevented from coming into contact with the optical sheet in the case where the polarizing film having the polarizing direction in the long side direction is positioned near the optical sheet. As a result, it is possible to inhibit occurrence of display defects due to deformation, wrinkling or the like of the optical sheet even in the case of the optical sheet being sandwiched between the liquid crystal panel and the diffusion plate.

In a display apparatus according to one embodiment of the present application, the first polarizing film is attached to the front surface of the liquid crystal panel, the bezel has the recess portion at the center portion of the long side thereof, and the panel chassis has the protruded portion at the center portion of the long side thereof.

According to the embodiment of the present application, the liquid crystal panel can be curved to be protruded toward the front surface thereof by means of the protruded portion of the panel chassis and the recess portion of the bezel. Therefore, the liquid crystal panel can be prevented from coming into contact with the optical sheet due to curving of the liquid crystal panel. As a result, it is possible to inhibit occurrence of display defects due to deformation, wrinkling or the like of the optical sheet even in the case of the optical sheet sandwiched between the liquid crystal panel and the diffusion plate. Further, by providing the recess portion, the occurrence of display defects due to correction of the curving caused by shrinkage of the polarizing film of the liquid crystal panel is inhibited.

In a display apparatus according to one embodiment of the present application, each of two long sides of the panel chassis has the protruded portion and each of two long sides of the bezel has the recess portion. According to the embodiment of the present application, the liquid crystal panel can be curved.

A method of manufacturing a display apparatus according to one embodiment of the present application comprises: preparing a rectangular-shaped liquid crystal panel in which a rectangular-shaped first polarizing film is attached to one of two outer surfaces of a pair of rectangular-shaped transparent substrates with a liquid crystal layer therebetween and a rectangular-shaped second polarizing film is attached to the other of the two outer surfaces, wherein a polarizing direction of the first polarizing film is a direction of a short side thereof and a polarizing direction of the second polarizing film is a direction of a long side thereof, arranging a rectangular frame-shaped panel chassis so as to abut against a peripheral portion of a rear surface of the liquid crystal panel, the rear surface corresponding to one of the pair of transparent substrates to which the second polarizing film is attached, the panel chassis having a protruded portion at a center portion of a long side thereof, arranging a rectangular frame-shaped bezel so as to abut against a peripheral portion of a front surface of the liquid crystal panel, the front surface corresponding to the other of the pair of transparent substrates to which the first polarizing film is attached, the bezel having a recess portion at a center portion of a long side thereof, holding the liquid crystal panel between the bezel and the panel chassis. A method of manufacturing a display apparatus according to one embodiment of the present application comprises: preparing a rectangular-shaped liquid crystal panel in which a rectangular-shaped first polarizing film is attached to one of two outer surfaces of a pair of rectangular-shaped transparent substrates with a liquid crystal layer therebetween and a rectangular-shaped second polarizing film is attached to the other of the two outer surfaces, wherein a polarizing direction of the first polarizing film is a direction of a long side thereof and a polarizing direction of the second polarizing film is a direction of a short side thereof, arranging a rectangular frame-shaped panel chassis so as to abut against a peripheral portion of a rear surface of the liquid crystal panel, the rear surface corresponding to one of the pair of transparent substrates to which the second polarizing film is attached, the panel chassis having a recess portion at a center portion of a long side thereof, arranging a rectangular frame-shaped bezel so as to abut against a peripheral portion of a front surface of the liquid crystal panel, the front surface corresponding to the other of the pair of transparent substrates to which the first polarizing film is attached, the bezel having a protruded portion at a center portion of a long side thereof, holding the liquid crystal panel between the bezel and the panel chassis.

According to the embodiment of the present application, occurrence of display defects can be inhibited.

DETAILED DESCRIPTION

Figure 1:
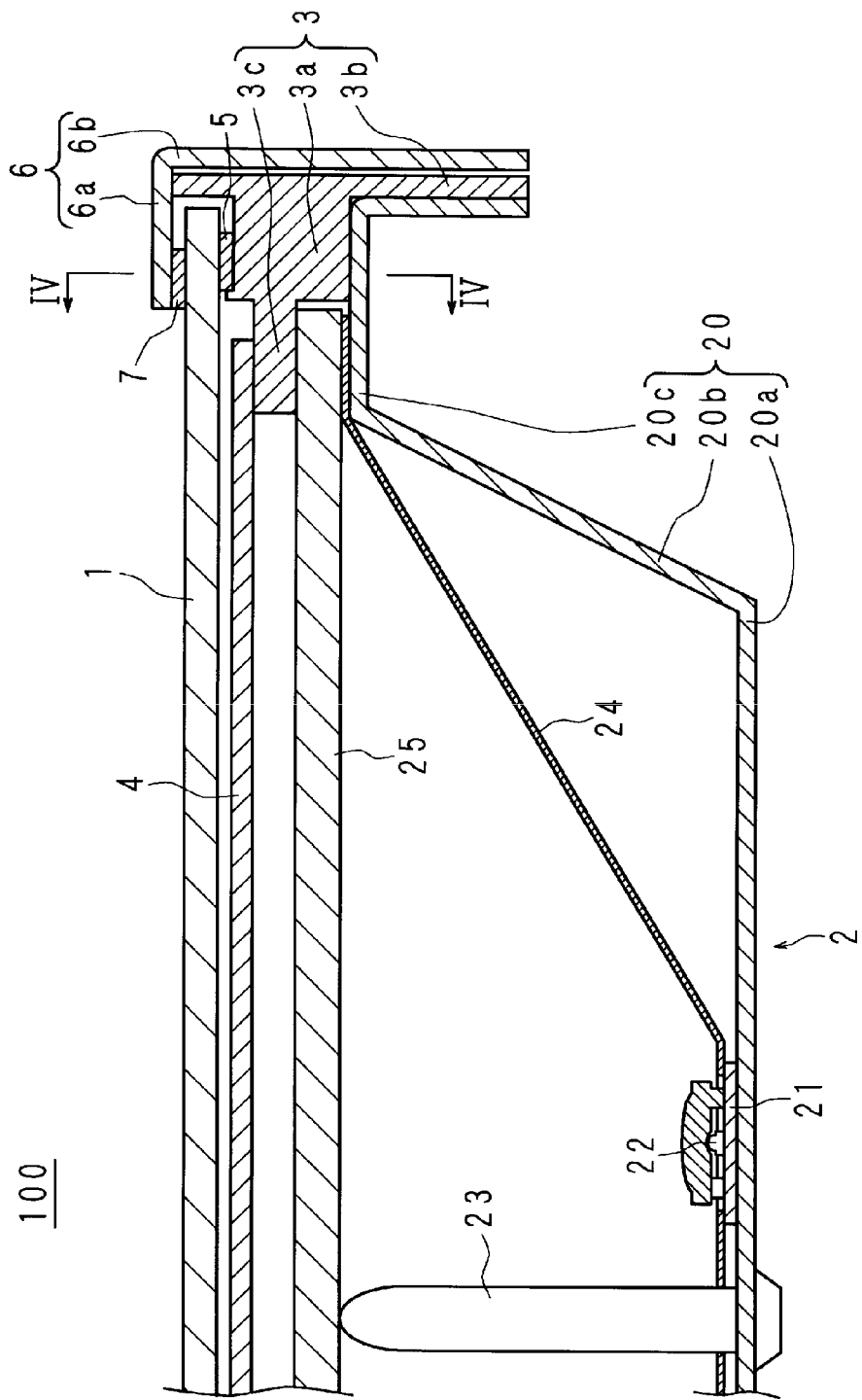
FIG. 1 shows a cross-sectional view of a display apparatus according to Embodiment 1.

The invention will be further described below in terms of several embodiments and particularly in terms of drawings showing some embodiments. FIG. 1 shows a cross-sectional view of a display apparatus according to Embodiment 1. In FIG. 1, a reference number 100 represents a display apparatus, and as shown in FIG. 1, the display apparatus 100 is provided with a rectangular-shaped liquid crystal panel 1 displaying an image on its front surface and a back light device 2 disposed opposed to a rear surface of the liquid crystal panel 1.

The back light device 2 has a back light chassis 20, a plurality of substrates 21 and a plurality of LEDs 22. The back light chassis 20 has a rectangular-shaped bottom plate 20a and side plates 20b extending from each of four sides of the bottom plate 20a, and is of shallow box type having an opening all over the bottom plate 20a. At an upper portion of the side plate 20b a flange portion 20c is provided so as to be extending outward.

The substrates 21 are disposed on the bottom plate 20a, and LED 22 are mounted on each of the substrates 21. A plurality of supporting pins 23 are provided on the bottom plate 20a not to interfere with each of the substrates 21. Each of the supporting pins 23 is protruded vertically to the bottom plate 20a and an end of each supporting pin 23 reaches a diffusion plate 25 to be disposed on the back light chassis 20.

On the bottom surface of the back light chassis 20, a reflection sheet 24 covering the inside of the back light chassis 20 is provided. The reflection sheet 24 has a rectangular-shaped bottom portion, side portions extending from four sides of the bottom portion, and flange portions extending from the side portions outward in parallel with the bottom portion. Holes for exposing the LEDs 22 and the supporting pins 23 are provided on the bottom portion of the reflection sheet 24. Each of the LEDs 22 provided on the substrate 21 and each of the supporting pins 23 are exposing from the respective holes at the bottom portion of the reflection sheet 24 toward the opening of the back light chassis 20. The flange portion of the reflection sheet 24 is overlaid on the flange portion 20c of the back light chassis 20, and the bottom portion and the side portion of the reflection sheet 24 cover the bottom plate 20a and the side plates 20b inside the back light chassis 20.

On the flange portion 20c of the back light chassis 20 are overlaid the reflection sheet 24 and the diffusion plate 25. The diffusion plate 25 performs diffusion of light emitted from the LED 22. The diffusion plate 25 is disposed to cover all over the opening of the back light chassis 20, and the peripheral portion of the diffusion plate 25 is supported by the flange portion 20c. A protruding end of the supporting pin 23 is in contact with one surface of the diffusion plate 25, and the diffusion plate 25 is supported by each of the supporting pins 23.

Further, a panel chassis 3 to support the liquid crystal panel 1 is disposed on the flange portion 20c. The panel chassis 3 has a flat plate portion 3a in a shape of a rectangular frame and a side plate portion 3b extending vertically to one surface of the flat plate portion 3a along an outer periphery at the flange portion 20c. A spacer 5 is disposed on a front surface of the flat plate portion 3a along the four sides of the flat plate portion 3a. The liquid crystal panel 1 is disposed on the front surface of the flat plate portion 3a via the spacer 5. Namely, the panel chassis 3 supports the liquid crystal panel 1 at the front surface of the flat plate portion 3a via the spacer 5.

Further, a thin protruded portion 3c protruding inward is provided all over the inner periphery of the flat plate portion 3a. The reflection sheet 24 and the diffusion plate 25 are sandwiched between the protruded portion 3c and the flange portion 20c. Further the optical sheet 4 is disposed on the protruded portion 3c. The optical sheet performs focusing of light from the diffusion plate 25 and the like.

The bezel 6 has a flat plate portion 6a in a shape of a rectangular frame and a side plate portion 6b extending vertically toward the back surface from the flat plate portion 6a at on outer periphery by bending the flat plate portion in a form of L. A spacer 7 is disposed on the back surface of the flat plate portion 6a of the bezel 6 along the four sides of the flat plate portion 6a. The liquid crystal panel 1 is sandwiched between the bezel 6 via the spacers 7 and 5, and the flat plate portion 3a of the panel chassis 3. The side plate portion 6b is extended along the side plate portion 3b of the panel chassis 3.

Figure 2:
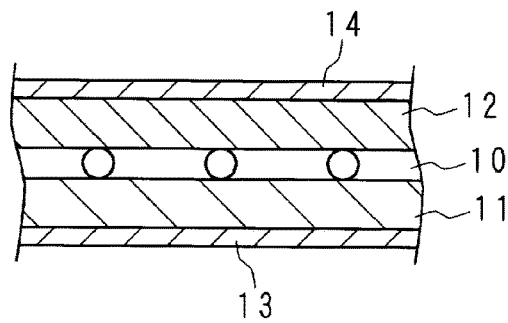
FIG. 2 shows a cross-sectional view of constitution of a liquid crystal panel.

FIG. 2 shows a cross-sectional view of constitution of a liquid crystal panel 1. The liquid crystal panel 1 includes a liquid crystal layer 10, an array substrate 11 and a color filter substrate 12. The liquid crystal layer 10 is sandwiched between the array substrate 11 and the color filter substrate 12. The color filter substrate 12 is disposed on one surface of the liquid crystal panel 1 and the array substrate 11 is disposed on the other surface thereof.

The array substrate 11 is a glass substrate disposed on one surface of the liquid crystal layer 10, and individual driver elements (not shown) arranged in array. The color filter substrate 12 is a glass substrate disposed on the other surface of the liquid crystal layer 10, on which a pattern of color filters (not shown) is formed for color display of an image. On the other surfaces of the array substrate 11 and the color filter substrate 12, polarizing films 13, 14 having the same shape are adhered, respectively.

The second polarizing film 13 attached to the array substrate 11 has a polarizing direction in a long direction, for example, and the first polarizing film 14 attached to the color filter substrate 12 has a polarizing direction in a short direction. Namely the two polarizing films 13, 14 are disposed opposite to each other so that the polarizing directions crossing at right angles. The polarizing films 13, 14 are formed by extending in a direction at a right angle to the polarizing direction. Therefore, under a high temperature environment, the polarizing films 13, 14 shrink in order to be brought into an original pre-formation state from an extended state.

Figure 3:
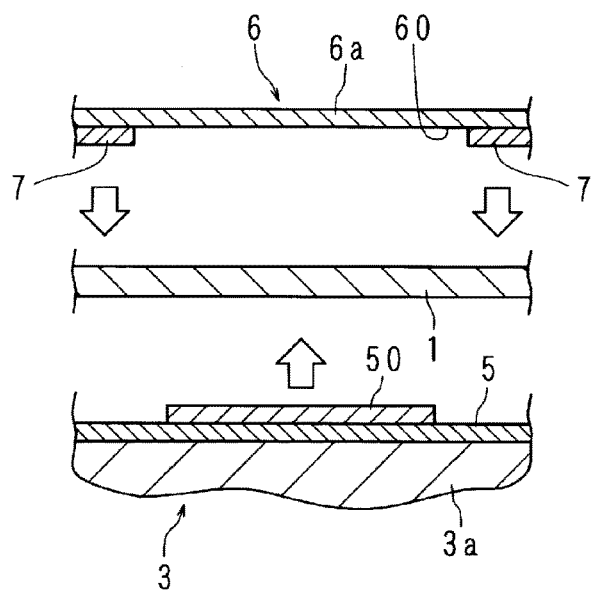
FIG. 3 shows an explanatory view of structures of a liquid crystal panel, a panel chassis and a bezel at a center portion of a long side of the display apparatus.
Figure 4:
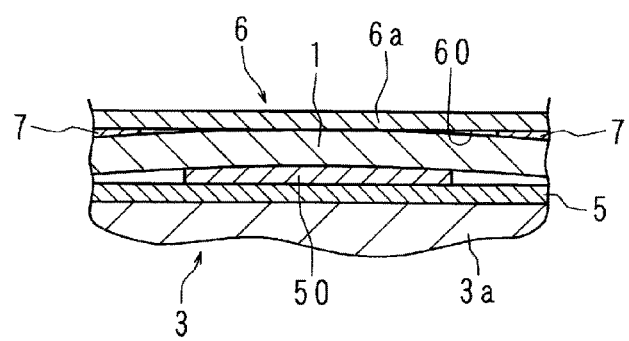
FIG. 4 shows a cross-sectional view of a IV-IV line of FIG. 1.

FIG. 3 shows an explanatory view of structures of the liquid crystal panel 1, the panel chassis 3 and the bezel 6 at a center portion of a long side of the display apparatus 100. FIG. 4 shows a cross-sectional view of a IV-IV line of FIG. 1. At the center portions of the respective long sides of the display apparatus 100, the spacer 5 provided on the panel chassis 3 has a protruded portion 50 protruding toward the bezel 6, and a notch having a length longer than the length of the protruded portion 50 is provided at the spacer 7 provided on the bezel 6 opposite to the protruded portion 50. Namely at the notched portion of the spacer 7, the bezel 6 has a recess portion 60 formed by a rear surface of the flat plate portion 6a and the end surface of the spacer 7.

Therefore, when the liquid crystal panel 1 is held by the bezel 6 and the panel chassis 3, forces shown by arrows in FIG. 3 are applied to the respective two long sides of the liquid crystal panel 1. In this embodiment, the second polarizing film 13 has the polarizing direction in the long side direction. Thus, in the display apparatus 100, the liquid crystal panel 1 is set in a curved state so that its front surface is protruded as shown in FIG. 4. It should be noted that heights of the protruded portion 50 and the spacer 7 are preferably 0.5 mm respectively. Actually a degree of the curvature of the liquid crystal panel 1 is very small, and FIG. 4 only shows a degree of the curving schematically.

In the display apparatus 100 so configured as mentioned above, light emitted from each of the LEDs 22 is diffused by the diffusion plate 25 and focused by the optical sheet 4 and emitted onto the rear surface of the liquid crystal panel 1. The light transmitted through the second polarizing film 13 attached to the array substrate 11 becomes light vibrating only in a long side direction of the polarizing film 13. The liquid crystal panel 1 displays an image on the front surface thereof, adjusting a light transmittance in the first polarizing film 14 attached to the color filter substrate 12, due to changing a vibration direction of light with the liquid crystal layer 10.

In the case of temperature rise during use of the display apparatus 100, the polarizing films 13, 14 shrink in a direction at the right angle to the polarizing direction in order to be brought into an original pre-formation state from an extended state. Therefore, as the polarizing film 13, 14 shrinks, the first polarizing film 14 attached to the color filter substrate 12 shrinks in the long side direction, and the second polarizing film 13 attached to the array substrate 11 shrinks in the short side direction.

The shrinking in the long side direction has greater influence on the liquid crystal panel 1, and the liquid crystal panel 1 is prone to be curved so that the rear surface of the liquid crystal panel 1 is projected. However, in the display apparatus 100, since the liquid crystal panel 1 is mounted so that the front surface thereof is protruded with a curved state, therefore the rear surface is not curved so as to protrude. So, the liquid crystal panel 1 is prevented from coming into contact with the optical sheet 4.

Therefore, the optical sheet 4 sandwiched between the liquid crystal panel 1 and the diffusion plate 25, is inhibited causing of wrinkling, deformation or the like. That is, occurrence of display defects can be inhibited. Here since the curving of the liquid crystal panel 1 is very small as mentioned above, the extent of deterioration of display quality due to the curving is negligible.

Further, by providing the recess portion 60, display defect arising by correcting curving of the liquid crystal panel 1 due to the shrinking of the polarizing films 13, 14 is inhibited. Furthermore, since the protruding portion 50 and the recess portion 60 are provided on each of the two long sides of the display apparatus 100, the liquid crystal panel 1 can be curved stably.

It should be noted that only the protruded portion 50 may be formed on the spacer 5 without forming the recess portion 60. Even in the case of only the protruded portion 50 is formed without recess portion 60, the liquid crystal panel 1 is curved so that its front surface is protruded by its self-weight.

According to the above-mentioned embodiments, the liquid crystal panel 1 is in a rectangular shape. Meanwhile, as long as a length in one direction is longer than a length in another direction crossing at a right angle to the one direction, the liquid crystal panel 1 may be in a shape of ellipse or in other shape. Further, the recess portion 60 may be formed directly on the bezel 6 without being formed by the bezel 6 and the spacer 7. In addition, the driver elements of the array substrate 11 and the color filters of the color filter substrate 12 may be formed from a resin substrate having transparency.

Further, the second polarizing film 13 having a polarizing direction in the long side direction may be disposed on the color filter substrate 12, namely at the front surface of the liquid crystal panel 1, and the first polarizing film 14 having a polarizing direction in a short side direction may be disposed on the array substrate 11. In this case, the recess potion is provided on the front surface of the flat plate portion 3a of the panel chassis 3, and the protruded portion is provided on the rear surface of the flat plate portion 6a of the bezel 6. Therefore, the liquid crystal panel 1 is curved so as to be projected toward the rear surface, and the bezel 6 can be prevented from be applied the unintentional load. As a result, it is possible to inhibit occurrence of display defect of display apparatus 100.

It should be appreciated that the disclosed embodiments are intended to be illustrative and not restrictive in all respects. The scope of the present invention is not limited to the above-described context, and the meaning equivalent to the claims and all modifications within the scope of the claims are intended to be included. Namely, various specific technical features described in the above embodiments can be combined in any suitable manner without contradiction.

What is claimed is:

1. A display apparatus comprising:
   a rectangular-shaped liquid crystal panel comprising a pair of transparent substrates with a liquid crystal layer therebetween, a rectangular-shaped first polarizing film or a rectangular-shaped second polarizing film attached to a front surface of the liquid crystal panel or a rear surface of the liquid crystal panel, wherein a polarizing direction of the first polarizing film is a direction of a short side thereof and a polarizing direction of the second polarizing film is a direction of a long side thereof,
   a diffusion plate disposed opposing to the rear surface of the liquid crystal panel,
   an optical sheet disposed between the liquid crystal panel and the diffusion plate,
   a rectangular frame-shaped panel chassis abutting against a peripheral portion of the rear surface of the liquid crystal panel, and
   a rectangular frame-shaped bezel abutting against a peripheral portion of the front surface of the liquid crystal panel,
   wherein the bezel or the panel chassis close to the first polarizing film than the second polarizing film has a recess portion at a center portion of a long side,
   wherein the panel chassis or the bezel close to the second polarizing film than the first polarizing film has a protruded portion at a center portion of a long side, the protruded portion orienting to the recess portion, and
   wherein the liquid crystal panel is held between the protruded portion and the recess portion.

2. The display apparatus of claim 1, wherein
   the first polarizing film is attached to the front surface of the liquid crystal panel,
   the bezel has the recess portion at the center portion of the long side thereof, and
   the panel chassis has the protruded portion at the center portion of the long side thereof.

3. The display apparatus of claim 2, wherein each of two long sides of the panel chassis has the protruded portion and each of two long sides of the bezel has the recess portion.

4. A method of manufacturing a display apparatus comprising:
   preparing a rectangular-shaped liquid crystal panel in which a rectangular-shaped first polarizing film is attached to a front surface which is one of two outer surfaces of a pair of rectangular-shaped transparent substrates with a liquid crystal layer therebetween and a rectangular-shaped second polarizing film is attached to a rear surface which is the other of the two outer surfaces, wherein a polarizing direction of the first polarizing film is a direction of a short side thereof and a polarizing direction of the second polarizing film is a direction of a long side thereof,
   arranging a rectangular frame-shaped panel chassis so as to abut against a peripheral portion of the rear surface of the liquid crystal panel, the panel chassis having a protruded portion at a center portion of a long side thereof,
   arranging a rectangular frame-shaped bezel so as to abut against a peripheral portion of the front surface of the liquid crystal panel, the bezel having a recess portion at a center portion of a long side thereof, the recess portion corresponding to the orientation of the protruded portion, holding the liquid crystal panel between the recess portion of the bezel and the protruded portion of the panel chassis.

5. A method of manufacturing a display apparatus comprising:
preparing a rectangular-shaped liquid crystal panel in which a rectangular-shaped first polarizing film is attached to a rear surface which is one of two outer surfaces of a pair of rectangular-shaped transparent substrates with a liquid crystal layer therebetween and a rectangular-shaped second polarizing film is attached to a front surface which is the other of the two outer surfaces, wherein a polarizing direction of the first polarizing film is a direction of a short side thereof and a polarizing direction of the second polarizing film is a direction of a long side thereof,
arranging a rectangular frame-shaped panel chassis so as to abut against a peripheral portion of the rear surface of the liquid crystal panel, the panel chassis having a recess portion at a center portion of a long side thereof,
arranging a rectangular frame-shaped bezel so as to abut against a peripheral portion of the front surface of the liquid crystal panel, the bezel having a protruded portion at a center portion of a long side thereof, the protruded portion orienting to the recess portion,
holding the liquid crystal panel between the protruded portion of the bezel and the recess portion of the panel chassis.

6. The display apparatus of claim 1, wherein
the first polarizing film is attached to the rear surface of the liquid crystal panel,
the bezel has the protruded portion at the center portion of the long side thereof, and
the panel chassis has the recess portion at the center portion of the long side thereof.

7. The display apparatus of claim 1, wherein the protruded portion orients to the liquid crystal panel.

8. The display apparatus of claim 1, wherein a length of the recess along the long side is longer than that of the protruded portion along the long side.

9. The display apparatus of claim 1, wherein the protruded portion is formed by providing a first spacer on the panel chassis or the bezel at the center portion of the long side.

10. The display apparatus of claim 1, wherein the recess portion is formed by providing second spacers on the bezel or the panel chassis at end portions of the long side.

11. The display apparatus of claim 1, wherein the protruded portion has a height of substantially 0.5 mm.

12. The display apparatus of claim 2, wherein the protruded portion is formed by providing a first spacer disposed on the panel chassis at the center portion of the long side, and the recess portion is formed by providing second spacers disposed on the bezel at end portions of the long side.

13. The display apparatus of claim 12, wherein a gap between the second spacers is a longer length than a length of the first spacer.

14. The display apparatus of claim 12, wherein the first spacer and the second spacers have a height of substantially 0.5 mm.

* * * * *